United States Patent Office 3,809,590
Patented May 7, 1974

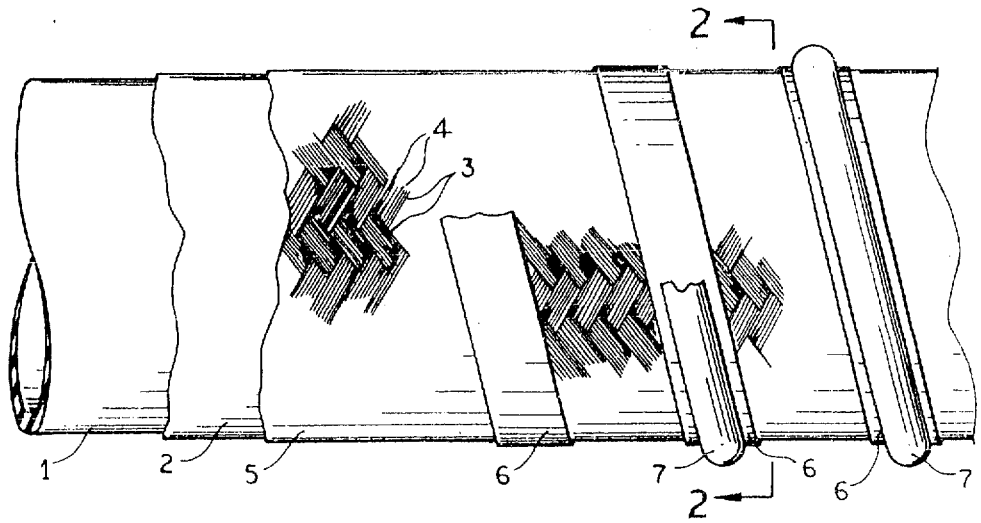
FIG 1
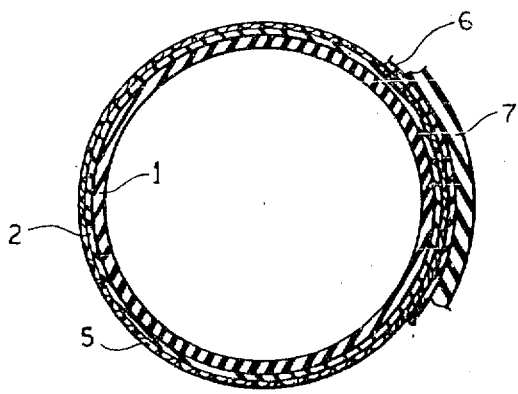
FIG 2
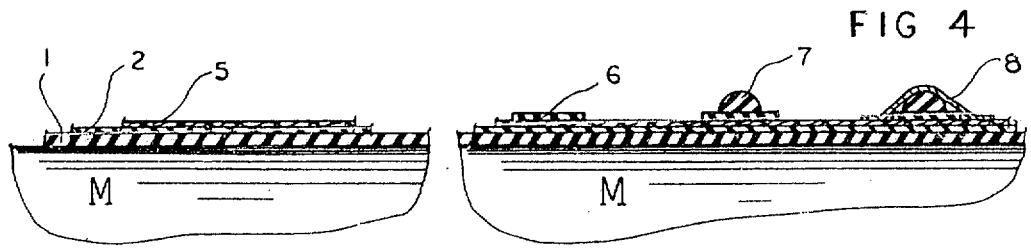
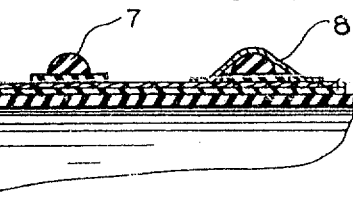
FIG 4
FIG 3

3,809,590
JET ENGINE STARTER HOSE AND
METHOD OF MAKING IT
Ralph S. Fantini, Philadelphia, and Robert W. Davison, Pittsburgh, Pa., assignors to H. K. Porter Company, Inc., Pittsburgh, Pa.
Filed Feb. 14, 1972, Ser. No. 226,003
Int. Cl. B32b 1/08
U.S. Cl. 156—149                                   1 Claim

ABSTRACT OF THE DISCLOSURE

The invention is directed to the provision of a heat and abrasion resistant fiexible hose especially adapted for use as jet engine starter hose and consists of polyester-fiber-yarn-reinforced hose having high heat resistance surrounded by a spirally or helically disposed buffer strip having high abrasion resistance at elevated temperatures such as those attained by jet engine starter hoses as well as good abrasion resistance at ordinary temperatures, the invention comprehending also a novel method of making the hose.

This invention constitutes an improvement over that of U.S. Letters Patent 3,073,353 granted Jan. 15, 1963 to the assignee of the present application.

BACKGROUND OF THE INVENTION

The field of the invention is in flexible pipes and tubular conduits with distinct layers bonded to each other and comprising a spirally wound layer or buffer strip on which the hose is supported above a supporting surface to facilitate circulation of ambient air about it and inhibit development of localized "hot spots."

The prior art includes said prior patent in which there is disclosed an outer jacket comprising a reticulated tube carrying a spirally wound rubber buffer strip and loosely containing a hose comprising a relatively wear resistant elastomeric inner tube surrounded by a braided or woven polyester fiber yarn reinforcement.

Jackets of this character have been reasonably satisfactory in service but being but loosely connected with the hoses they contain, have often been deemed objectionable as tending to accumulate dust and other foreign matter which, clogging the interstices in the reticulated tube, ends to restrict free circulation of air therethrough and impairs dissipation of heat imparted to the hose within by the hot air passing through it.

Other prior patents have suggested spirally wound strips of substantial radial thickness incorporated in the wall of hoses and other flexible conduits, either to minimize damage from abrasion or to resist collapse as in suction hoses used in low internal pressure situations but these have usually been made of metal or combinations of metal and elastomeric materials not highly abrasion resistant at elevated temperatures, those consisting entirely of metal tending to become separated from the the hose at elevated temperatures, undue susceptibility to abrasion at elevated temperatures tending to disqualify the hose from usefulness in starting jet engines.

SUMMARY OF THE INVENTION

The invention in summary is embodied in a hose comprising an extruded seamless inner tube of heat resistant silicone elastomer overlaid by an additional layer of silicone elastomer and a reinforcing layer made of a plurality of ends of polyester fiber yarns braided in herringbone pattern over the tube and bonded thereto by a partial curing operation, a thin tape of heat and abrasion resistant silicone elastomer applied in a spiral or helix to the outer surface of the reinforcing layer and overlying all a relatively thick strip of heat and abrasion resistant silicone elastomer of substantially semicircular cross section conforming to said tape, bonded to it and through it to the reinforcing layer during heat curing under pressure, the elastomeric compound used in the tape and in the buffer strip being one which is capable of retaining a high degree of abrasion resistance at elevated temperatures such as those reached in service by jet engine starter hoses.

BRIEF DESCRIPTION OF THE DRAWING

In the accompanying drawing:
FIG. 1 is a side elevation partly broken away in successive structural layers of a length of jet engine starter hose embodying the invention;
FIG. 2 is a transverse section of the hose;
FIG. 3 is a fragmentary longitudinal section of a portion of a length of the hose as it appears at one stage of its manufacture in accordance with our novel method and
FIG. 4 is a fragmentary section similar to FIG. 3 but illustrating further progress in the manufacture of the hose.

DESCRIPTION OF THE PREFERRED EMBODIMENT

Referring now more particularly to the drawing, in the manufacture of our hose we produce initially by extrusion on to a hollow cylindrical mandrel M a tube 1 of uncured silicone rubber composition .045 to .060 inch thick which we then subject to an initial partial vulcanization in a hot mandrel M. Over this tube we then apply an outer cover 2 of uncured silicone rubber composition sheet material .050 inch thick and on the outer surface of the composite inner tube preferably by braiding tapes 3, each comprising a plurality of, for example, six parallel ends 4 of a four ply polyester fiber yarn are formed into a yarn reinforcement 5; preferably the fiber marketed as Du Pont Dacron is used for the outer reinforcing layer 5 closely embracing the composite inner tube with its yarns partially embedded in the silicone rubber composition cover 2, at its surface, the manner of braiding these tapes being preferably such as to produce the 2 x 2 herring-bone pattern illustrated in FIG. 1.

Over the reinforcing layer 5 we apply a silicone rubber composition tape 6 one inch wide, about .050 inch thick, in a spiral or helical conformation of about 2¼ inches pitch on hose of 3½ inches I.D. On this strip we then wind in a congruent helix a buffer strip 7 consisting of extruded silicone rubber composition in a continuous strip of approximately semicircular cross section, ½ inch wide with its outer periphery curved to approximately ¼ inch radius centered coincidentally with the flat inner face of the strip. The assembly is then temporarily tightly wrapped in a nylon or other relatively elastic heat resistant fabric tape 8, then covered with a relatively inert heat insulating blanket (not shown) and super heated steam at 300° F. is introduced to the interior of the mandrel M and maintained therein for approximately 40 minutes, or until the silicone composition has been fully cured. The steam is then cut off, the insulating blanket and tape 8 removed and the mandrel M extracted in accordance with usual procedures, following which end fittings, not shown, are supplied to the finished hose.

It is essential to the production of our jet engine starter hose that the elastomeric component be of a silicone composition having a high tensile strength and high elongation within a reasonable aging period after curing and that it be capable of retaining these properties as well as high abrasion resistance, at the elevated temperatures to which starter hose is subjected in service.

For example, as shown in the appended Table I, a silicone rubber composition 48 hours after curing may have 1060 p.s.i. tensile strength and 420% elongation as compared with 335 p.s.i. and only 30% elongation attained by a typical rubber composition useful for normal situations not requiring subjection to high temperatures such as found in jet engine starter hose.

TABLE I

| Materials | Hours of aging | | | | | | | | |
|---|---|---|---|---|---|---|---|---|---|
| | 0 | | | 24 | | | 48 | | |
| | Duro, Shore A | Tensile, p.s.i. | Elongation, percent | Duro, Shore A | Tensile, p.s.i. | Elongation, percent | Duro, Shore A | Tensile, p.s.i. | Elongation, percent |
| Silicone | 45 | 1,020 | 520 | 55 | 730 | 330 | 50 | 1,060 | 420 |
| Compound 2831—75% natural rubber, 25% SBR | 60 | 2,400 | 550 | 80 | 380 | 100 | 80 | 335 | 30 |

We find that silicone rubber compositions retain their elasticity and abrasion resistance at elevated temperatures to a degree enabling the hose and its buffer strip to endure a relatively long service life, whereas hoses of similar physical structure and design but made with ordinary elastomeric compositions, while useful at normal atmospheric temperatures tend to distintegrate rapidly in service under conditions imposed upon jet engine starter hoses. The buffer strip is thus able to support the hose above an airway runway surface sufficiently to enable ambient air to circulate about it and minimize the generation of overheated areas due to low heat conductivity of the runway surface.

We claim:

1. The method of making a heat and abrasion resistant jet engine starter hose which comprises extruding over a hollow cylindrical mandrel a silicone elastomeric composition seamless tube, partially curing the tube by subjecting it for about one minute to a temperature of approximately 850° F. in air, covering the tube with a sheet of silicone elastomeric composition having approximately the thickness of the tube wall, applying over said covering sheet a braided reinforcing layer of a polyester fiber yarn, applying in a spiral formation over said reinforcing layer a silicone elastomeric composition tape in spiral conformation at a pitch of about two-thirds the inside diameter of the tube, conforming to the spiral tape a strip of silicone elastomeric composition having substantially semicircular cross section with its curved surface projecting outwardly from the tube, confining the assembled components within a spirally wound elastic fabric tape to thereby exert radial inward pressure on said components, enclosing the tape wrapped components within a heat insulated space, introducing a fluid at about 300° F. to the interior of the mandrel and maintaining a flow of said fluid therethrough for about forty minutes, then discontinuing the flow of fluid in the mandrel, removing the elastic fabric tape and extracting the mandrel from the finished tube.

References Cited

UNITED STATES PATENTS

| 3,073,353 | 1/1963 | Rittenhouse | 138—148 |
| 3,223,565 | 12/1965 | Fritz et al. | 156—86 |
| 3,684,602 | 8/1972 | Ball | 156—149 |
| 3,500,867 | 3/1970 | Elson | 138—125 |
| 2,988,130 | 6/1961 | Rittenhouse | 156—86 |

DOUGLAS J. DRUMMOND, Primary Examiner

F. FRISENDA, JR., Assistant Examiner

U.S. Cl. X.R.

156—172, 187